United States Patent [19]

Sandlin

[11] 3,757,842

[45] Sept. 11, 1973

[54] MOUNTING DEVICE FOR TIRE CHAINS

[76] Inventor: Delbert Elden Sandlin, 6375 N. Palm, Fresno, Calif. 93704

[22] Filed: Oct. 12, 1971

[21] Appl. No.: 188,108

[52] U.S. Cl. .............................................. 152/216
[51] Int. Cl. ........................................... B60c 27/00
[58] Field of Search ........................... 152/216, 236

[56] References Cited
UNITED STATES PATENTS

| 2,681,681 | 6/1954 | Muller | 152/316 |
| 2,395,013 | 2/1946 | Reese | 152/316 |

*Primary Examiner*—James B. Marbert
*Attorney*—Herbert A. Huebner et al.

[57] ABSTRACT

A mounting device, for a tire chain of a type having opposite ends including a plurality of individually selectable fastener links extended therefrom. The device is characterized by a pair of protuberances oppositely extended from the plane of the tire and to which is attached a pair of said links, whereby rotation of the tire serves to draw the chain about the tire in an encircling fashion.

4 Claims, 8 Drawing Figures

PATENTED SEP 11 1973 3,757,842
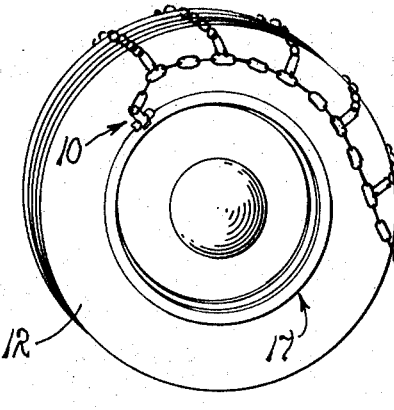
FIG. 1.
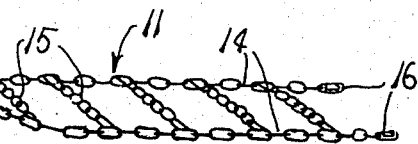
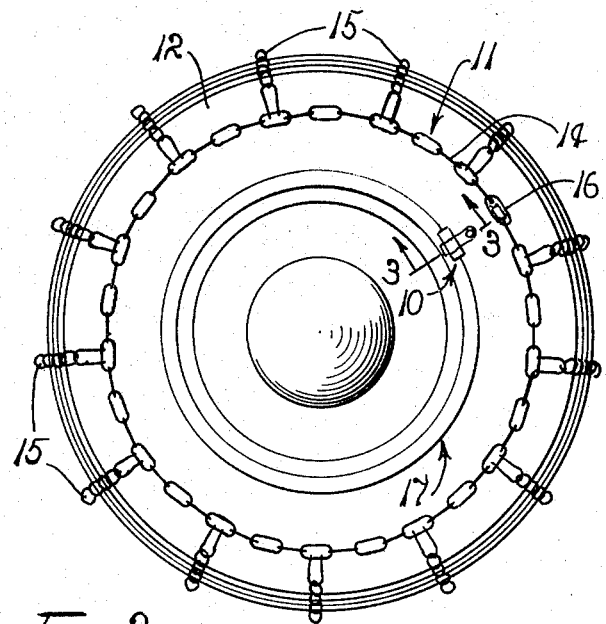
FIG. 2.
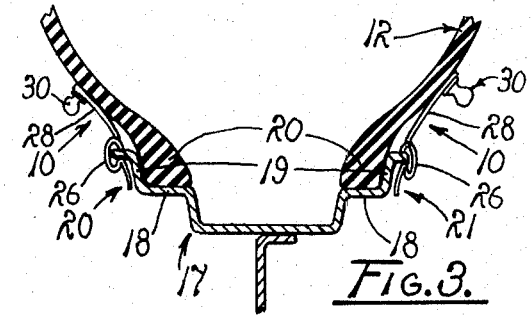
FIG. 3.
FIG. 8.
FIG. 4.
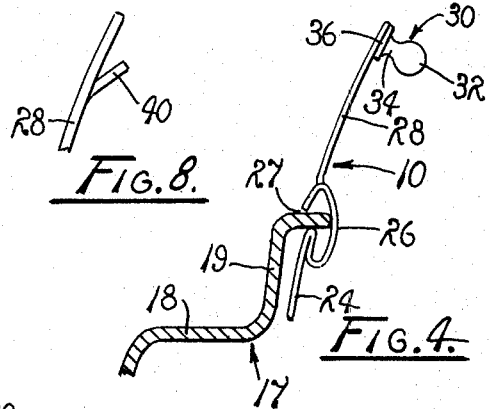
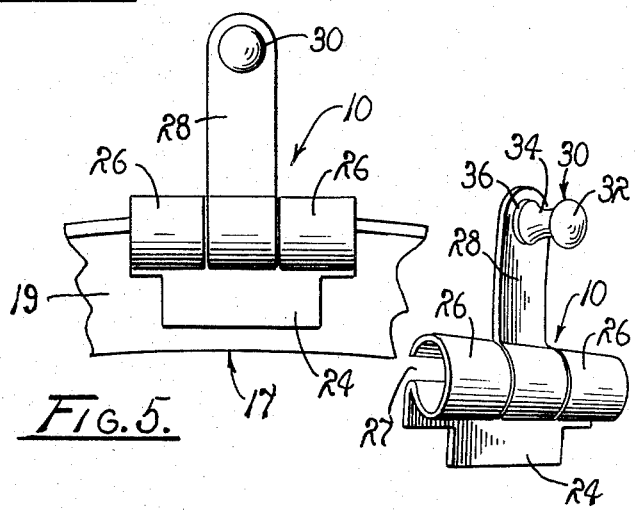
FIG. 5. FIG. 6.
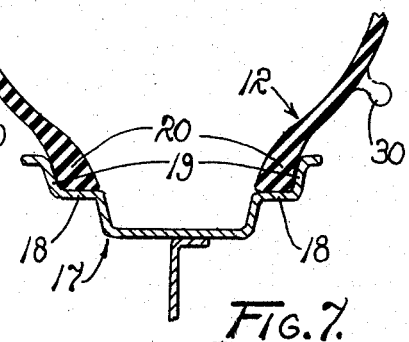
FIG. 7.

MOUNTING DEVICE FOR TIRE CHAINS

BACKGROUND OF THE INVENTION

Conventional tire chains are frequently difficult to install because of the relatively inefficient, clumsy and unmanageable devices provided for installing the chains. Adverse weather conditions, which normally require the use of tire chains, also aggravate the usual installation difficulties encountered in mounting them.

One type of device heretofore employed is of a type which is clamped to the periphery of a tire to provide a pair of oppositely extended hook portions to which is attached one end of the tire chain so that by rotating the tire, the chain is caused to be fully draped in circumscribing relation about the tire, after which the ends of the chains are drawn sufficiently closely together to permit the manipulation of the fastening devices to their closed locking positions. This type of device usually is formed as a spring clamp and is extended across the tread surface of a tire prior to mounting the chain. While this type of device has met with a degree of success, there is a distinct tendency for the clamp to skew or otherwise slip along the surface of the tire and thus fail, accompanied by a resultant substantial sliding movement of the chain around the tire. Inasmuch as this often results in both ends of each chain being released, both must be simultaneously manipulated and held during subsequent operation of the fastening devices which is extremely difficult, particularly for someone working alone. Furthermore, currently available devices must be mounted at each installation and thereafter removed. This necessarily increases the probability that the device will be lost or misplaced and not be available at a required time of use. This can readily be appreciated when it is recalled that the conditions which normally necessitate the use of chains frequently are of a nature which tends to frustrate automobile operators.

Accordingly, it has long been recognized that it would be desirable to provide a simple device, which can be fixed to a wheel, for dependably and securely anchoring one end of a tire chain, at opposite sides of a tire, in order to free the installer's hands for manipulation of the chain fastening device in order to enhance installation of tire chains under adverse weather conditions.

SUMMARY OF THE INVENTION

Accordingly, it is an object of the present invention to provide an improved mounting device for tire chains.

Another object is to facilitate tire chain mounting and demounting.

Another object is to provide an improved mounting device for tire chains which is easily and conveniently installed and employed without special tools.

Another object is to provide an improved mounting device for tire chains which precludes need for simultaneous manipulation of both ends of a tire chain.

Another object is to provide an improved mounting device which is adapted to be installed on a wheel rim for greater ease and convenience in mounting and demounting tire chains than is possible when employing currently available devices.

Another object is to provide an improved mounting device of the character described which is adapted permanently to be installed on the wheel rim for immediate use and which may remain on the rim between periods of use without interfering with normal operation of the vehicle.

Another object is to provide an improved mounting device for tire chains which permits one end portion of the tire chain to be secured in fixed relation to the tire and the opposite free end portion thereof to be secured to said one end portion with minimal effort.

These and other objects and advantages of the present invention are achieved through the use of a pair of resilient protuberances fixed to extend outwardly from the plane of a tire, as will subsequently become more clearly apparent upon reference to the following description and accompanying drawing.

BRIEF DESCRIPTION OF THE DRAWING

FIG. 1 is a perspective view of the mounting device of the present invention as it is installed on a wheel rim showing a tire chain connected at one of its ends, prior to its being installed about a tire supported by the rim of the wheel.

FIG. 2 is a somewhat enlarged side elevation of the wheel and tire with a tire chain constrained thereabout in a fully installed position.

FIG. 3 is a somewhat enlarged transverse vertical section through the tire and chain, taken along line 3—3 of FIG. 2, showing a mounting device of the present invention fixed to the rim of a wheel with protuberances projected from opposite sides of the tire.

FIG. 4 is an enlarged front elevational view of a portion of the mounting device of the present invention.

FIG. 5 is a side elevational view of the portion of the device shown in FIG. 4.

FIG. 6 is a perspective view of the portion of the device shown in FIGS. 1 through 5.

FIG. 7 is a sectional view of a tire illustrating a modified embodiment of the device.

FIG. 8 is a fragmented elevational view of still another embodiment of the invention.

DESCRIPTION OF THE PREFERRED EMBODIMENTS

Referring more particularly to the drawing, wherein like reference characters designate like or corresponding parts there is illustrated a mounting device or clip for tire chains embodying the principles of the present invention, generally indicated by the reference numeral 10. The mounting device is adapted dependably to secure a conventional tire chain 11 in peripherally circumscribing relation upon a tire 12. The chain 11 provides opposite side runs 14 having a plurality of transversely interconnecting longitudinally equally spaced ground engaging traction members 15 therebetween with each side run terminating at the opposite ends of the chain in a plurality of selectively engageable fastener links 16. The tire 12 is mounted upon a wheel 17 having a rim 18 providing oppositely spaced flanges 19 sealably supporting the beads 22 of the tire 12.

The mounting device 10, as illustrated in FIGS. 3 through 6, includes a first and a second portion 20 and 21, as shown in FIG. 3. As the portions 20 and 21 are of a similar design, a description of a single one of the portions is deemed adequate for providing a complete understanding of the invention.

Each portion of the device 10 is formed of a substantially resilient sheet metal stock and includes a substantially flat base 24. The base 24 has opposite ends 26, each being deformed into a C-clamp configuration establishing a slot 27 for receiving therein the flange 19 of the rim 18. In view of the inherent resiliency of the material from which the device 10 is fabricated, the base 24 securely grips the flange 19 and thus securely affixes itself thereto.

From the base 24 there is projected a tongue 28 which is formed as an integral part of the base 24. Consequently, the tongue 28 also is of a resilient construction. When mounted on the rim 18, the tongue is extended radially from the rim and engages the side wall of the tire and, accordingly, is deflected outwardly, within its elastic limits. This deflection of the tongue serves to apply an additive force to the force of the base 24 as it grips the rim 18 for securing the base to the wheel 17.

At the distal end of the tongue 28 there is mounted a protuberance 30 having an enlarged head 32, a body 34 and an enlarged pedestal 36. In practice, the protuberance 30 is fabricated from a suitable material which retains a resilient characteristic when subjected to ice and snow. Various compositions of commercially available synthetic materials serve quite satisfactorily.

The particular manner in which the protuberance 30 is affixed to the distal end of the tongue 28 is a matter of convenience. In practice, studs screw-threadingly extended through the tongue as well as adhesive and the like are utilized quite satisfactorily for this purpose.

Since the protuberance 30 is fixedly secured to the wheel 17, it remains in place until its use is desired, whereupon a link of the chain is inserted thereover for thus anchoring one end of the chain 11 whereby its installation is enhanced by freeing both hands of the person engaged in installing the chain 11 about the tire 12.

As illustrated in FIG. 7 and FIG. 8, the invention may be embodied in forms other than the specific form depicted in FIGS. 2 through 6. For example, the protuberances 30 are, where so desired, adhesively secured to the side wall of the tire, preferably at points which are protected from engagement with curbs and the like. Additionally, as depicted in FIG. 8, the protuberance 30 can, if so desired, be replaced by a tab 40, integral with the tongue 28, formed by partially severing and deflecting a minor portion of the tongue into a plane angularly related to a major portion thereof.

OPERATION

The operation of the described embodiments of the subject invention is believed to be readily apparent and is briefly summarized at this point.

The device 10, illustrated in FIGS. 2 through 6, can quickly and conveniently be installed, by manipulation, in any desired circumferential location on the rim 18 of the wheel 17. This is accomplished by inserting the flange 19 of the rim 18 between the adjacent portions of the base 24 which are configured to define therebetween the slot 27. The bracket thus is secured in such position by the force of the resiliency applied against the flange, as shown in FIG. 3.

Accordingly, the mounting device 10 can remain permanently installed on the rim 18 of the wheel 17 in order to be ready for immediate use when necessary or desired. If preferred, it can be mounted on an occasion of contemplated use and removed following use by simply striking it with an impact tool tangentially to the wheel.

Of course, where the protuberances 30 are affixed to the side wall of the tire, as illustrated in FIG. 7, the device remains in place throughout the effective life of the tire 12.

With the mounting device 10 disposed in its secured position on the rim 18, links of the end portion of the chain 11 are positioned over the protuberances 30 so that the chain 11 can be installed on the tire 12 in the usual manner. As best shown in FIG. 1, such initial mounting step involves hooking the links near the leading end of the chain onto the mounting device 10. This is preferably done on both the inside and the outside of the wheel 17. The tire 12 is then rotated so that the hooked leading end of the chain is wrapped about the outer periphery of the tire and the free end of the chain is brought into close proximity to the device 10.

The hooking procedure just described enables the chain 11 to be automatically wrapped around the outer periphery of the tire 12 during movement of the tire in a manner which disposes the chain 11 in optimum position for completing the hooking of the opposite free end thereof. This is accomplished simply by hooking links 16 of the chain at the free end with selected links adjacent the device 10, or securing a conventional toggle or other fastening devices thereto. This operation is substantially the same for both portions of the mounting devices 10.

In view of the foregoing, it is readily apparent that the structure of the present invention provides an improved mounting device for tire chains which enables such chains to be easily, quickly and conveniently installed with a minimum of effort and in a minimum of time. The mounting device permanently is installed so as to be in position for immediate use in completing the installation without requiring any special tools.

Although the invention has been herein shown and described in what are conceived to be the most practical and preferred embodiments, it is recognized that departures may be made therefrom within the scope of the invention, which is not to be limited to the illustrative details disclosed.

I claim:

1. In a device for use in mounting a tire chain, including a plurality of individually selectable fastener links, about the periphery of a wheel including a circumscribing rim, an annular flange extended from said rim, and an inflated tire mounted thereon, the improvement which comprises:

means defining an elongated, resilient body having an arcuate cross-sectional configuration defining an elongated slot for receiving therein an arcuate segment of an annular flange extended in a substantially axial direction from the rim of a selected wheel, said slot having a length substantially coincident with the length of said body and a width substantially less than the thickness of the segment of the rim when said body is relaxed, said slot being expansible in response to stress selectively imposed on the body so that said segment of the rim is forcibly gripped by said body when it is received in said slot in a stress imposing relationship with the body; an elongated resilient tongue having a base integrally related with said body and extended therefrom in an orthogonal relationship with the slot and in a direction such that said tongue is disposed in strained engagement with a sidewall of a tire mounted on said rim, when said segment thereof is received in said slot; and means defining a protuberance extended from the distal end of said tongue for receiving a fastener link of a tire chain preparatory to mounting the chain on said tire.

2. The improvement of claim 1 wherein said protuberance includes a pedestal and a head supported by the pedestal.

3. The improvement of claim 1 wherein said protuberance comprises a severed portion of said tongue deflected to a plane angularly related to the plane of the tongue.

4. A device for use in mounting a tire chain about the periphery of a wheel including an inflated tire supported in circumscribing relationship therewith, said chain having opposite end portions, each including a plurality of individually selectable fastener links for facilitating installation of the chain about the tire, means for securing one end of the chain in a fixed relationship with respect to said tire comprising a pair of protuberances extended in a substantially axial direction from the plane of said tire, each of said protuberances having a pedestal formed integrally with a sidewall of the tire, and an enlarged head supported by said pedestal.

* * * * *